United States Patent
Ou et al.

(10) Patent No.: US 9,380,484 B2
(45) Date of Patent: Jun. 28, 2016

(54) METHOD AND APPARATUS TO PREVENT RADIO ACCESS NETWORK (RAN) OVERLOAD IN A WIRELESS COMMUNICATION SYSTEM

(75) Inventors: Meng-Hui Ou, Taipei (TW); Yu-Hsuan Guo, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 217 days.

(21) Appl. No.: 13/449,709

(22) Filed: Apr. 18, 2012

(65) Prior Publication Data

US 2012/0263039 A1 Oct. 18, 2012

Related U.S. Application Data

(60) Provisional application No. 61/476,643, filed on Apr. 18, 2011.

(51) Int. Cl.
*H04L 12/26* (2006.01)
*H04W 28/02* (2009.01)
*H04W 74/00* (2009.01)

(52) U.S. Cl.
CPC ........ *H04W 28/0205* (2013.01); *H04W 74/006* (2013.01)

(58) Field of Classification Search
CPC ................... H04W 28/0242; H04W 28/0289; H04W 48/06
USPC .......................................................... 370/232
See application file for complete search history.

(56) References Cited

U.S. PATENT DOCUMENTS

| | | | |
|---|---|---|---|
| 2010/0069037 A1* | 3/2010 | Fischer et al. ................. | 455/410 |
| 2010/0190499 A1* | 7/2010 | Wu ................. | 455/436 |
| 2011/0021154 A1* | 1/2011 | Marinier et al. ........... | 455/67.11 |
| 2011/0086642 A1* | 4/2011 | Lee et al. ........................ | 455/445 |
| 2011/0199898 A1* | 8/2011 | Cho et al. ....................... | 370/230 |
| 2012/0039171 A1* | 2/2012 | Yamada et al. ................ | 370/232 |
| 2012/0069728 A1* | 3/2012 | Jung et al. ...................... | 370/216 |
| 2012/0270540 A1* | 10/2012 | Ode et al. ................... | 455/426.1 |
| 2013/0028184 A1* | 1/2013 | Lee et al. ....................... | 370/328 |

* cited by examiner

*Primary Examiner* — Shaq Taha
(74) *Attorney, Agent, or Firm* — Blue Capital Law Firm, P.C.

(57) ABSTRACT

A method and apparatus are disclosed to prevent RAN (Radio Access Network) overload. In one embodiment, the method comprises initiating, at a User Equipment (UE), a RRC (Radio Resource Control) connection establishment procedure to establish a RRC connection to a cell. The method also comprises initiating, at the User Equipment (UE), a Random Access procedure due to a transmission of a RRCConnectionRequest message for the RRC connection establishment procedure, wherein an establishment cause in the RRCConnectionRequest message is set to delay tolerant access, and the UE stops the Random Access procedure if the UE considers access to the cell as barred based on barring information for delay tolerant access of the cell.

14 Claims, 8 Drawing Sheets

__US 9,380,484 B2__

METHOD AND APPARATUS TO PREVENT RADIO ACCESS NETWORK (RAN) OVERLOAD IN A WIRELESS COMMUNICATION SYSTEM

CROSS-REFERENCE TO RELATED APPLICATIONS

The present Application claims the benefit of U.S. Provisional Patent Application Ser. No. 61/476,643 filed on Apr. 18, 2011, the entire disclosure of which is incorporated herein by reference.

FIELD

This disclosure generally relates to wireless communication networks, and more particularly, to a method and apparatus to prevent RAN overload in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed to prevent RAN (Radio Access Network) overload. In one embodiment, the method comprises initiating, at a User Equipment (UE), a RRC (Radio Resource Control) connection establishment procedure to establish a RRC connection to a cell. The method also comprises initiating, at the User Equipment (UE), a Random Access procedure due to a transmission of a RRCConnectionRequest message for the RRC connection establishment procedure, wherein an establishment cause in the RRCConnectionRequest message is set to delay tolerant access, and the UE stops the Random Access procedure if the UE considers access to the cell as barred based on barring information for delay tolerant access of the cell.

DETAILED DESCRIPTION

The exemplary wireless communication systems and devices described below employ a wireless communication system, supporting a broadcast service. Wireless communication systems are widely deployed to provide various types of communication such as voice data and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-100330, "Revised SID: RAN Improvements for Machine-type Communications"; TS 22.011 V10.3.0, "Service accessibility"; R2-111918, "Extended Access Barring for delay tolerant devices", ZTE; TS 36.331 V10.1.0, "RRC protocol specification (Release 10)"; and TS 36.321 V10.1.0, "MAC protocol specification (Release 10)". The standards and documents listed above are hereby expressly incorporated herein.

Figure 1:
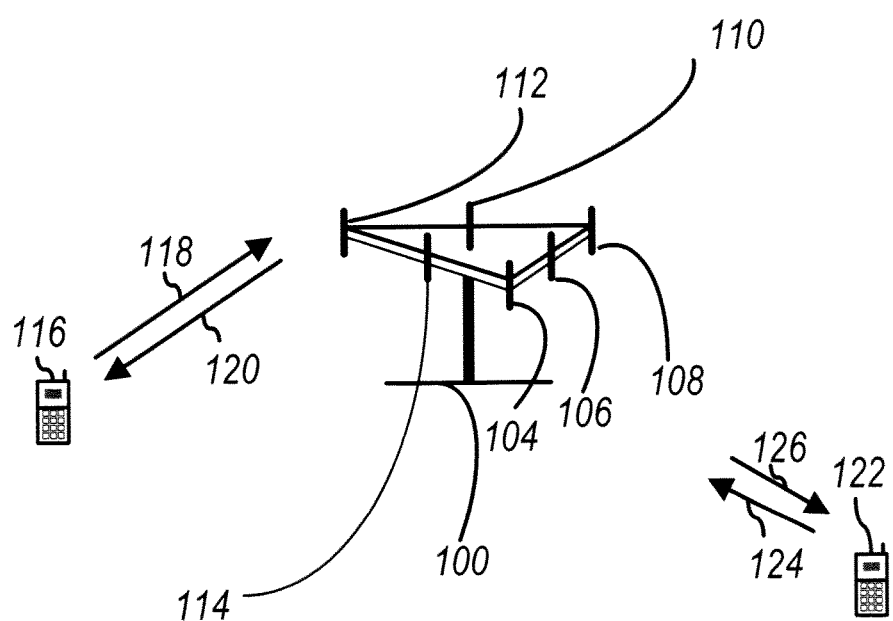
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126 the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
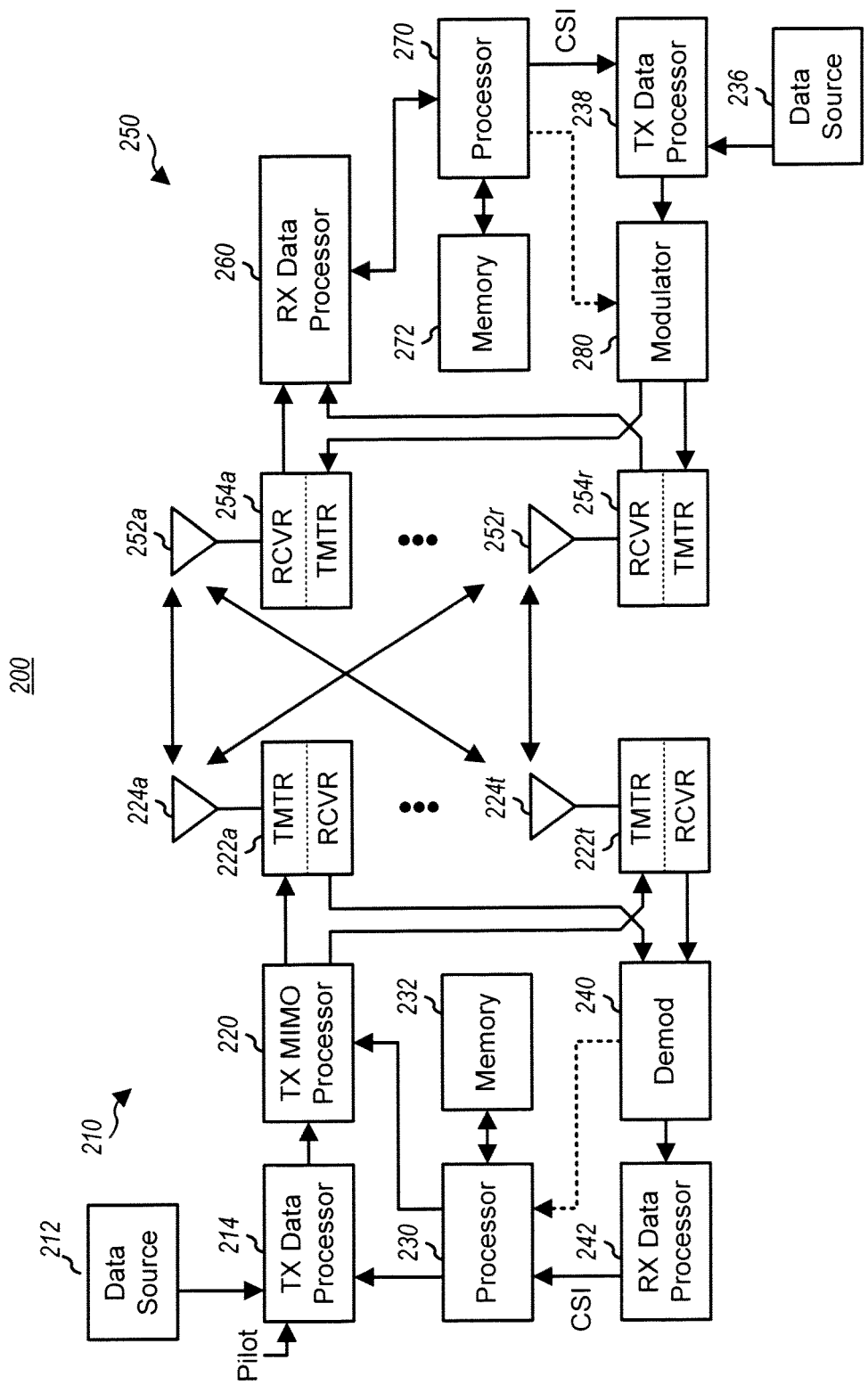
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g. for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
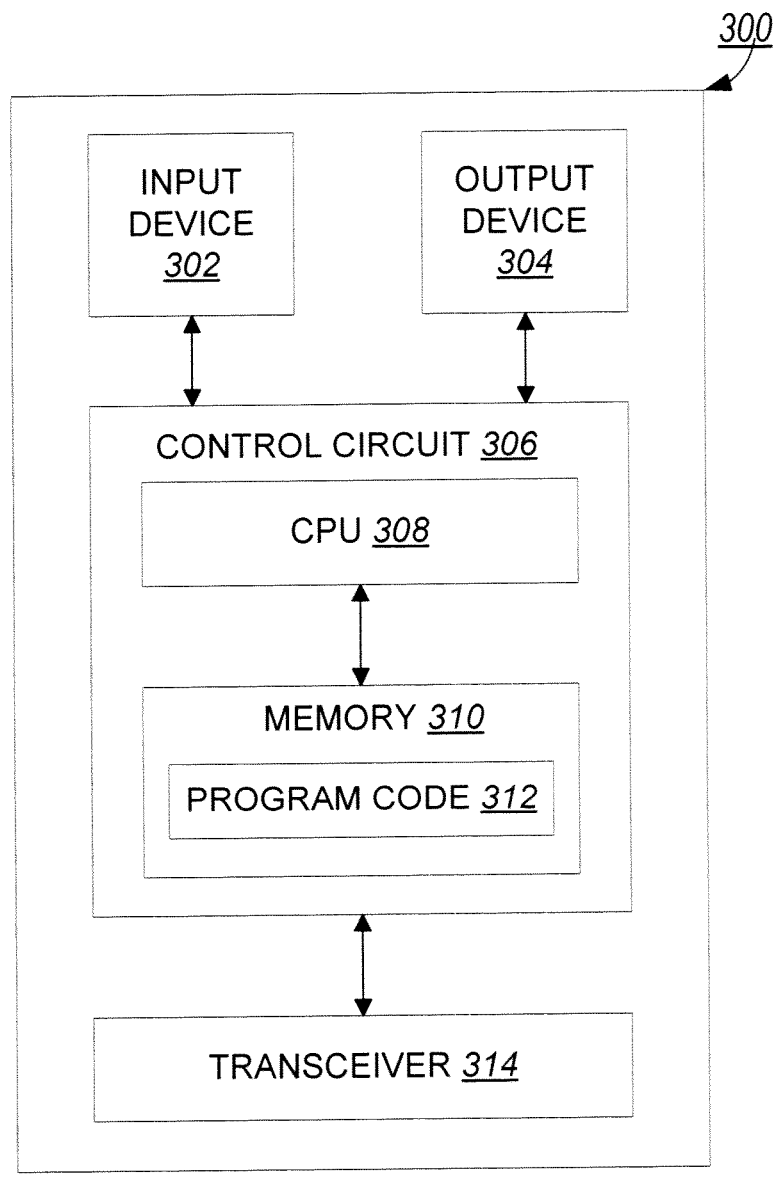
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the UE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
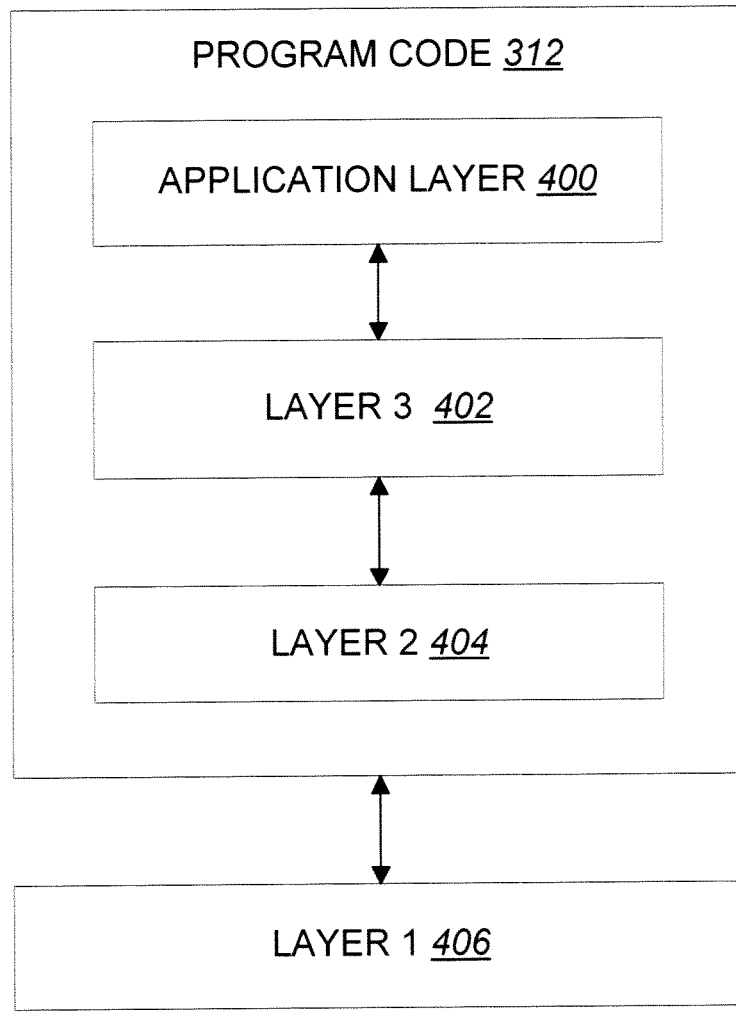
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As communicated in 3GPP RP-100330, the discussion of the study item "RAN improvements for Machine Type Communication" is resumed for LTE and UMTS Rel-11. Currently, the main objective of the study item appears to be on preventing Radio Access Network (RAN) overload situation caused by the access from a large amount of Machine Type Communication (MTC) UEs.

As discussed in 3GPP (TS 22.011 V10.3.0), it has been agreed by Service and System Aspects Working Group 1 (SA1) that Extended Access Barring (EAB) could be used to prevent overload in GSM/EDGE Radio Access Network (GERAN) Rel-10. As such, EAB could be a candidate solution for LTE and UMTS Rel-11 to prevent RAN overload.

In general, Extended Access Barring (EAR) is a mechanism for the operation(s) to control Mobile Originating access attempts from UEs that are configured for EAB in order to prevent overload of the Radio Access Network and/or the core network. In congestion situations, the operator could restrict access from UEs configured for EAB while permitting access from other UEs. The UEs configured for EAB would be considered more tolerant to access restrictions than other UEs. When an operator determines that it is appropriate to apply EAB, the network would broadcast necessary information to provide EAB control for UEs in a specific area.

In Radio Access Network Working Group 2 (RAN2) #73bis meeting, the agreement made by RAN2 is that the extension of Access Barring based on SA1 requirements will be introduced in Rel-11. 3GPP R2-111918 discusses exemplary EAB implementation details (such as, barring factor and barring time for delay tolerant access should be broadcasted by network). In addition, the details of current operation of access barring or access class barring could be found in 3GPP TS 36.331 V10.1.0. As an example, the check of access barring or access class barring is performed upon the initiation of a RRC (Radio Resource Control) connection establishment procedure. After the check, when a UE performs a RRC connection establishment procedure, a Random Access procedure (as discussed in 3GPP TS 36.321 V10.1.0) would be triggered in order to transmit an RRCConnectionRequest message (as discussed in 3GPP TS 36.331 V10.1.0). Furthermore, the delay-tolerant access is currently mainly used for the purpose of MTC.

A possible exemplary sequence of initiating EAB mechanism for RAN overload control could generally be as follows:
1. Many delay-tolerant MTC UEs access a cell (for example, by a Random Access procedure) at the same time or virtually at the same time.
2. The network detects the situation of RAN overload.
3. The network broadcasts the indication and/or parameters for EAB.
4. A delay-tolerant MTC UE, that tries to access the cell when EAB is enabled, could be barred so that RAN overload could be controlled.
The delay-tolerant MTC UEs, which could be controlled by EAB, are configured for EAB.

Figure 5:
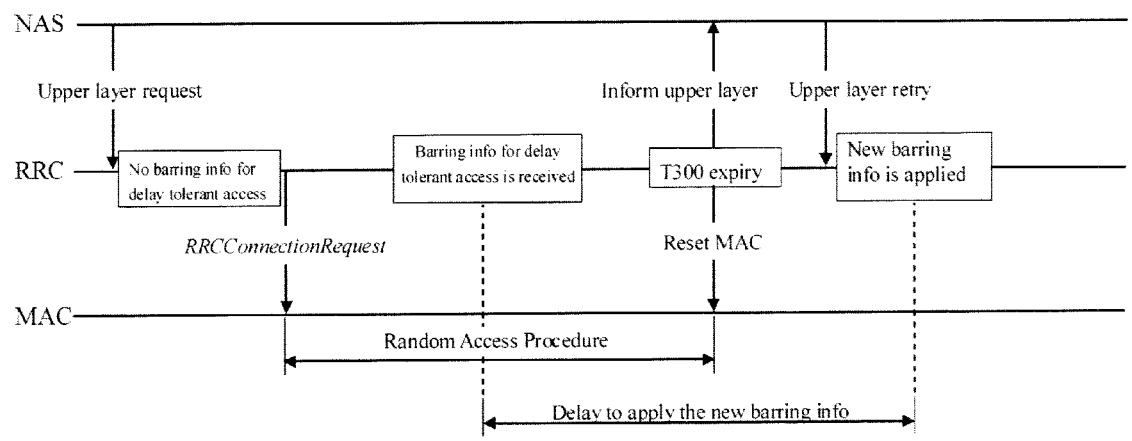
FIG. 5 is an illustration in accordance with one exemplary embodiment.

FIG. 5 is an illustration in accordance with one exemplary embodiment. As shown in FIG. 5, one issue is that those delay-tolerant MTC UEs (mentioned in step 1 above) accessing the cell before EAB is enabled could not be barred by EAB because the barring check for EAB would be performed at the next time a RRC connection establishment procedure is initiated. As a result, those delay-tolerant UEs (who already initiate the transmission or an RRCConnectionRequest message) would continue to perform the ongoing Random Access procedures until successful completion (as discussed in 3GPP TS 36.321 V10.1.0) or failure (such as T300 expiry as discussed in 3GPP TS 36.331 V10.1.0). Then, during the period of performing the ongoing Random Access procedures by those delay-tolerant UEs, access performance (e.g. successful rate) of normal UEs (such UEs which are not delay-tolerant or not configured for EAB) would be affected due to the increase of contention of Random Access. Also, as the UE spends longer time trying to access a cell (e.g., by a Random Access procedure), the device would consume more power.

Several alternatives to solve the issue are discussed below. These alternatives can be used individually or together to solve the issue and to improve RAN overload by shorten the period during which many MTC UEs simultaneously invokes accesses.

Figure 6:
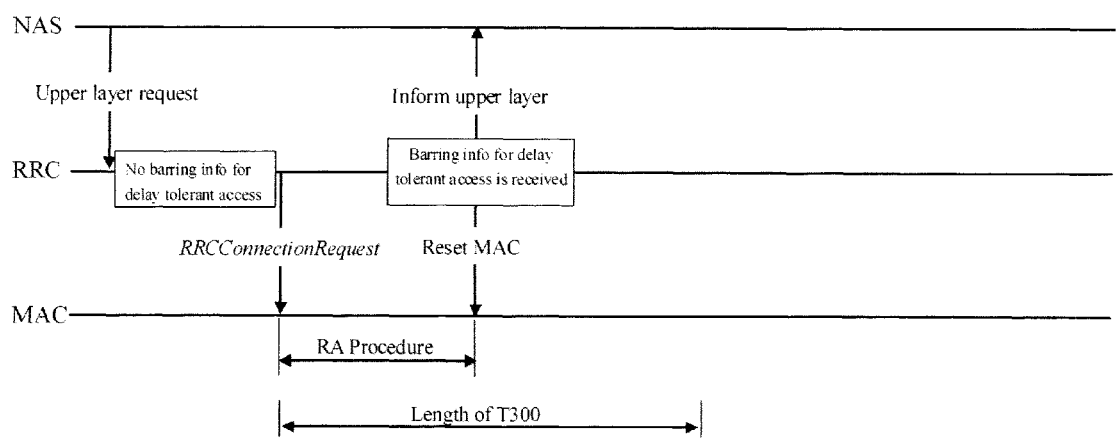
FIG. 6 provides an illustration in accordance with one exemplary embodiment.

FIG. 6 provides an illustration in accordance with one exemplary embodiment. As shown in FIG. 6, during a Random Access procedure performed by a UE or a MTC UE due to RRC connection establishment to a cell with delay tolerant access, if system information is updated with barring information for delay tolerant access, the UE should check whether it is barred. Furthermore, if the UE considers the access to the cell as barred, the UE would stop the ongoing Random Access procedure. As a result, the check for barring information for delay tolerant access would be performed immediately instead of at the next initiation of a RRC connection establishment procedure. In one embodiment, the barring information for delay tolerant access could be indications or parameters for EAB.

Figure 7:
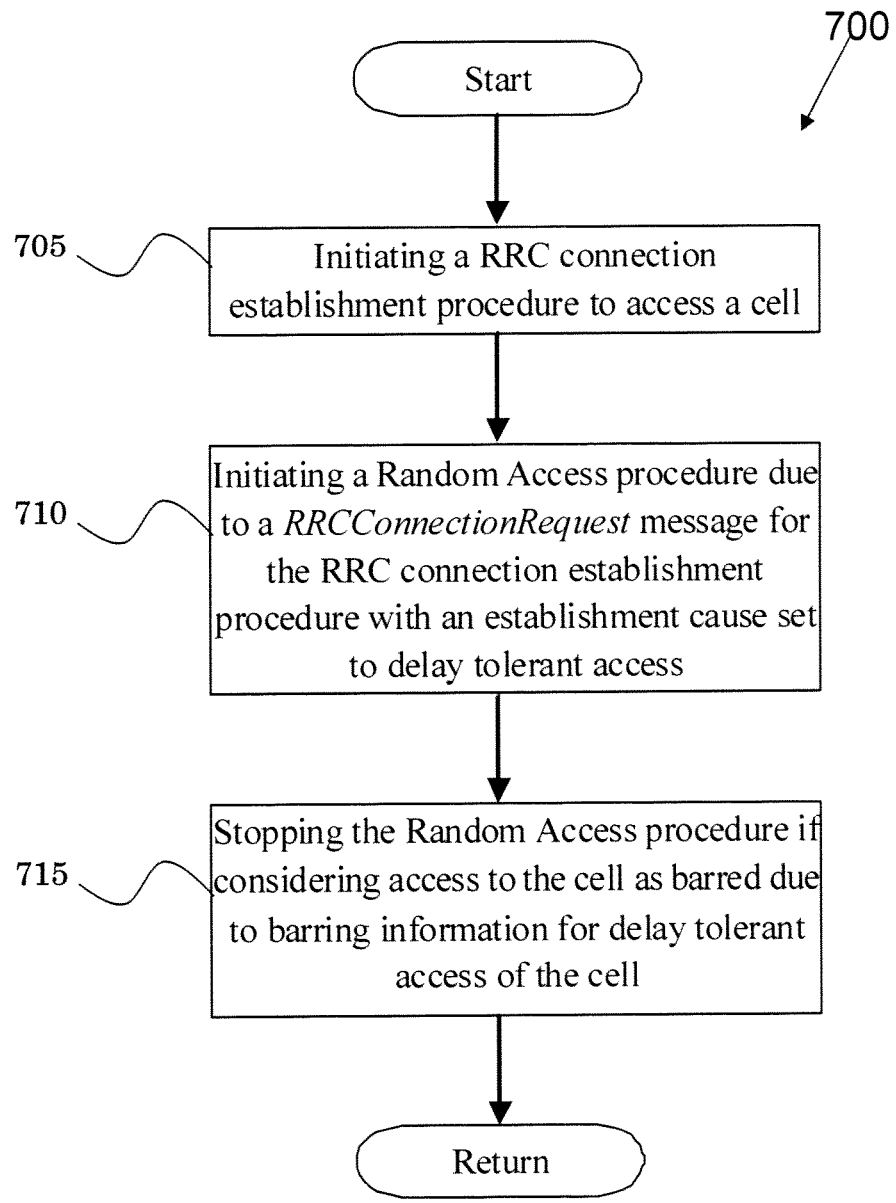
FIG. 7 illustrates a flow chart in accordance with one exemplary embodiment.

FIG. 7 illustrates a flow chart 700 in accordance with one exemplary embodiment. In step 705, the UE would initiate a RRC connection establishment procedure to access a cell. In one embodiment, the UE is a MTC UE. In step 710, the UE would initiate a Random Access procedure upon initiating a transmission of a RRCConnectionRequest message that is for the RRC connection establishment procedure and that has a cause for establishment set to delay tolerant access. In step 715, the UE would stop the Random Access procedure if the UE considers access to the cell as barred based on the cell's barring information for delay tolerant access. In one embodiment, the UE would stop the Random Access procedure by resetting MAC.

In one embodiment, the barring information for delay tolerant access is received during the Random Access procedure, and/or is carried by the system information (such as SystemInformationBlockType2). In an alternative embodiment, the barring information for delay tolerant access is received due to the reception of a Paging message informing system information change. In another embodiment, the barring information for delay tolerant access would includes a barring factor or a barring time, and would be different from previously received barring information for delay tolerant access of the cell. In another embodiment, the UE would consider access to the cell as barred (i) when drawing a random number larger or equal to a barring factor corresponding to delay tolerant access, or (ii) when the UE did not have barring information for delay tolerant access of the cell before receiving the barring information for delay tolerant access during the Random Access procedure.

In one embodiment, if the UE considers access to the cell to be barred, the UE would perform one or more of the following actions:
  the UE would reset Medium Access Control (MAC);
  the UE would stop a timer T300 (discussed in 3GPP TS 36.331 V10.1.0);
  the UE would re-establish RLC for all RBs (Radio Bearer) that have been established; and/or
  the UE would abort the RRC connection establishment procedure.

Referring back to FIGS. 3 and 4, the UE 300 includes a program code 312 stored in memory 310. In one embodiment, the CPU 308 could execute the program code 312 (i) to initiate a RRC connection establishment procedure to establish a RRC (Radio Resource Control) connection to a cell, and (ii) to initiate a Random Access procedure due to a transmission of a RRCConnectionRequest message for the RRC connection establishment procedure, wherein an establishment cause in the RRCConnectionRequest message is set to delay tolerant access, and the UE stops the Random Access procedure if the UE considers access to the cell as barred based on barring information for delay tolerant access of the cell.

In addition, the CPU 308 can execute the program code 312 to perform all of the above-described actions and steps or others described herein.

In one embodiment, a MTC UE performing RRC connection establishment procedure for delay tolerant access could determine when to stop a RRC connection establishment procedure based on a first length of time. More specifically, the first length of time is generally a pre-allocated time interval during which the RRC connection establishment procedure for delay tolerant access should be performed. At the expiration (or the end) of the first length of time, the MTC UE would stop the RRC connection establishment procedure for delay tolerant access. Furthermore, the first length of time would be different from a second length of time (such as different values of T300) used by the UE performing RRC connection establishment procedure for causes other than for delay tolerant access, such as for mobile terminating call. This may be under the condition that system information (communicated, for example, through a SystemInformationBlockType2) is not changed.

Figure 8:
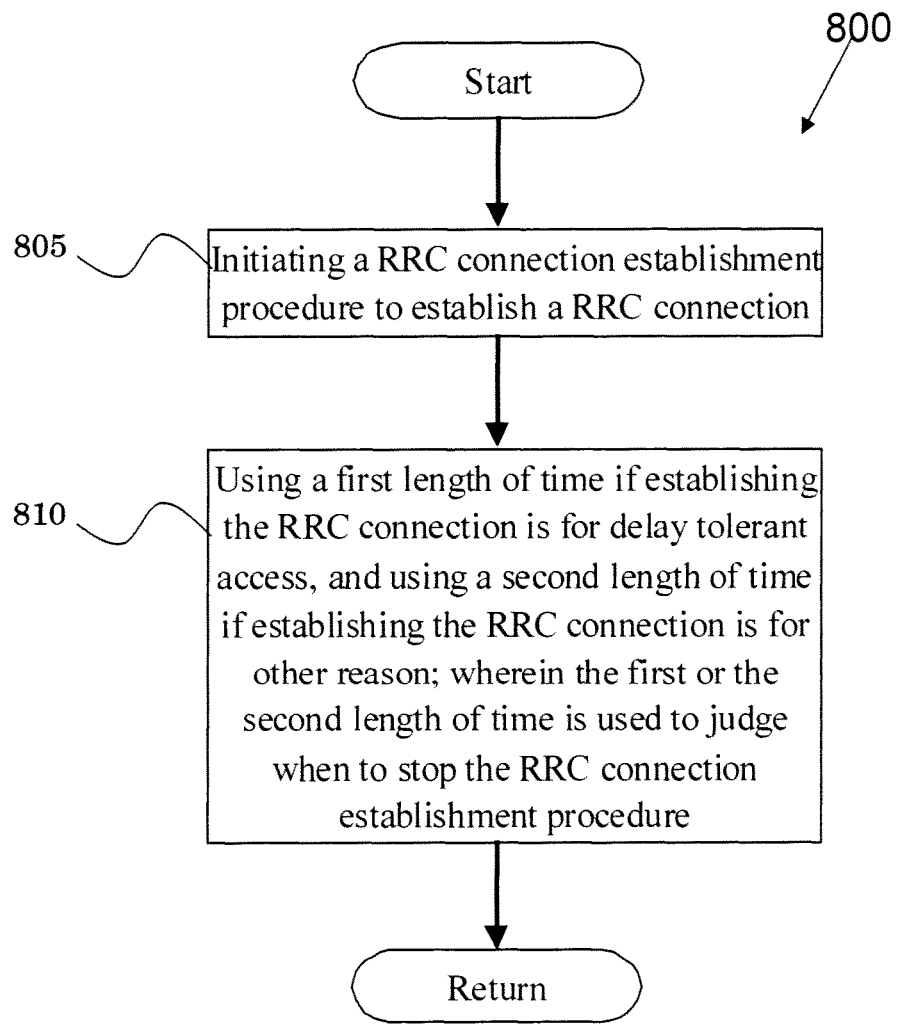
FIG. 8 illustrates a flow chart in accordance with one exemplary embodiment.

FIG. 8 illustrates a flow chart 800 in accordance with one exemplary embodiment. In step 805, the UE initiates a RRC connection establishment procedure to establish a RRC connection. In one embodiment, the UE is a MTC UE. In step 810, the UE would use (i) a first length of time associated with establishing the RRC connection for delay tolerant access, and (ii) a second length of time associated with establishing the RRC connection for other causes or reasons (such as for a mobile terminating call, an emergency call, a highPriority-Access, or a mt-Access as discussed in 3GPP TS 36.331 V10.1.0). In general, the first and second lengths of time would be used to determine or judge when to stop the RRC connection establishment procedure.

In one embodiment, a first timer would be used to keep track of the first length of time, and a second timer would be used to keep track of the second length of time. In this embodiment, the first timer and the second timer could be run simultaneously. Furthermore, the first timer could be started upon initiation of the transmission of a RRCConnectionRequest message or upon an upper layer requesting establishment of an RRC connection. In addition, when the first timer for the first length of time expires, the UE would perform one or more of the following actions:

the UE would stop the RRC connection establishment procedure;
the UE would reset Medium Access Control (MAC);
the UE would re-establish RLC for the RBs (Radio Bearer) that have be established;
the UE would stop the ongoing Random Access procedure; and/or
the UE would stop T300.

In an alternative embodiment, the network could broadcast multiple (e.g., two) timing information elements to indicate different lengths of time to use to determine when to stop a RRC connection establishment procedure. For example, one timing information element is for UEs with delay tolerant cause and the other timing information element is for UEs with other cause. Under these circumstances, if the UE with delay tolerant cause uses a shorter T300 value, the barring check for delay tolerant cause would be performed sooner, such as at next time a RRC connection establishment is initiated.

Referring back to FIGS. 3 and 4, the UE 300 includes a program code 312 stored in memory 310. In one embodiment, the CPU 308 could execute the program code 312 (i) to initiate a RRC connection establishment procedure to establish a RRC (Radio Resource Control) connection to a cell, and (ii) to use a first length of time if the UE is establishing the RRC connection for delay tolerant access, and a second length of time if the UE is establishing the RRC connection for other reasons, wherein the first length of time and the second length of time are used to determine when to stop the RRC connection establishment procedure.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method to prevent RAN (Radio Access Network) overload, comprising:
    initiating, at a User Equipment (UE), a RRC (Radio Resource Control) connection establishment procedure to establish a RRC connection to a cell; and
    initiating, at the UE, a Random Access procedure due to a transmission of a RRCConnectionRequest message for the RRC connection establishment procedure wherein there is no barring information for delay tolerant access of the cell upon initiation of the Random Access procedure,
    wherein an establishment cause in the RRCConnectionRequest message is set to delay tolerant access; and
    stopping, at the UE, the Random Access procedure after the Random Access procedure has been initiated and is ongoing, and the UE receives updated barring information for delay tolerant access during the ongoing Random Access procedure specifying that the cell should be barred,
    wherein the barring information for delay tolerant access includes indications or parameters for EAB (Extended Access Barring).

2. The method of claim 1, wherein the UE is a MTC (Machine Type Communication) UE.

3. The method of claim 1, wherein the barring information for delay tolerant access is carried by system information (such as a SystemInformationBlockType2).

4. The method of claim 1, wherein the UE is configured for EAB.

5. The method of claim 1, wherein the UE stops the Random Access procedure by resetting MAC (Mediation Access Control).

6. The method of claim 1, wherein the UE re-establishes Radio Link Control (RLC) for Radio Bearers (RB) that have been established when the UE considers access to the cell as barred.

7. A communication device for use in a wireless communication system, the communication device comprising:
    a control circuit;
    a processor installed in the control circuit;
    a memory installed in the control circuit and coupled to the processor;
    wherein the processor is configured to execute a program code stored in memory to prevent RAN (Radio Access Network) overload by:
    initiating, at a User Equipment (UE), a RRC (Radio Resource Control) connection establishment procedure to establish a RRC connection to a cell; and
    initiating, at the UE, a Random Access procedure due to a transmission of a RRCConnectionRequest message for the RRC connection establishment procedure wherein there is no barring information for delay tolerant access of the cell upon initiation of the Random Access procedure,
    wherein an establishment cause in the RRCConnectionRequest message is set to delay tolerant access; and
    stopping, at the UE, the Random Access procedure after the Random Access procedure has been initiated and is ongoing, and the UE receives updated barring information for delay tolerant access during the ongoing Random Access procedure specifying that the cell should be barred,
    wherein the barring information for delay tolerant access includes indications or parameters for EAB (Extended Access Barring).

8. The communication device of claim 7, wherein the UE is a MTC (Machine Type Communication) UE.

9. The communication device of claim 7, wherein the barring information for delay tolerant access is carried by system information (such as a SystemInformationBlockType2).

10. The communication device of claim 7, wherein the UE is configured for EAB.

11. The communication device of claim 7, wherein the UE stops the Random Access procedure by resetting MAC (Mediation Access Control).

12. The communication device of claim 7, wherein the UE re-establishes Radio Link Control (RLC) for Radio Bearers (RB) that have been established when the UE considers access to the cell as barred.

13. The method of claim 1, wherein the UE stops a timer T300 when the UE considers access to the cell as barred.

14. The communication device of claim 7, wherein the UE stops a timer T300 when the UE considers access to the cell as barred.

* * * * *